United States Patent [19]

Holmgren et al.

[11] 4,160,204
[45] Jul. 3, 1979

[54] NON-CONTACT DISTANCE MEASUREMENT SYSTEM

[75] Inventors: William A. Holmgren; John S. Hasling; Richard W. Denny, all of Colorado Springs, Colo.

[73] Assignee: Kaman Sciences Corporation, Colorado Springs, Colo.

[21] Appl. No.: 522,509

[22] Filed: Nov. 11, 1974

[51] Int. Cl.² ............................................. G01R 33/12
[52] U.S. Cl. ..................................... 324/207; 324/200; 324/222
[58] Field of Search .............. 324/34 D, 34 PS, 34 R, 324/40, 41; 336/30

[56] References Cited

U.S. PATENT DOCUMENTS

| 3,450,985 | 6/1969 | Lorenzi et al. | 324/40 |
| 3,609,527 | 9/1971 | Ellis | 324/40 |
| 3,851,242 | 11/1974 | Ellis | 324/34 PS |
| 3,870,948 | 3/1975 | Holt et al. | 324/34 PS |

FOREIGN PATENT DOCUMENTS

| 674174 | 6/1952 | United Kingdom | 324/34 D |
| 729884 | 5/1955 | United Kingdom | 324/34 D |

Primary Examiner—Rudolph V. Rolinec
Assistant Examiner—Ernest F. Karlsen
Attorney, Agent, or Firm—Max L. Wymore

[57] ABSTRACT

This distance measurement system employs the principle of electromagnetic induction to sense distances between an inductive transducer and an object. The inductive transducer forms a part of a signal phase network, and a means for comparing the signal of the inductive transducer to a reference signal provides linear output of the dimension between the transducer and an object. A circuit element such as a capacitor is connected in parallel with the inductive transducer to enhance the sensitivity and resolution of the measurement, to significantly reduce or eliminate error due to temperature, and to provide a high degree of output linearity relative to the distance measured.

12 Claims, 10 Drawing Figures

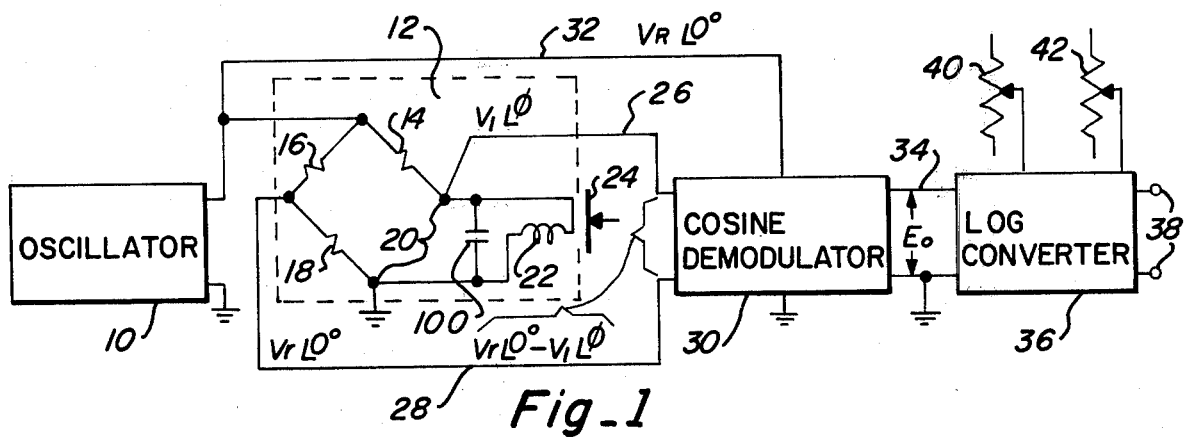
Fig_1
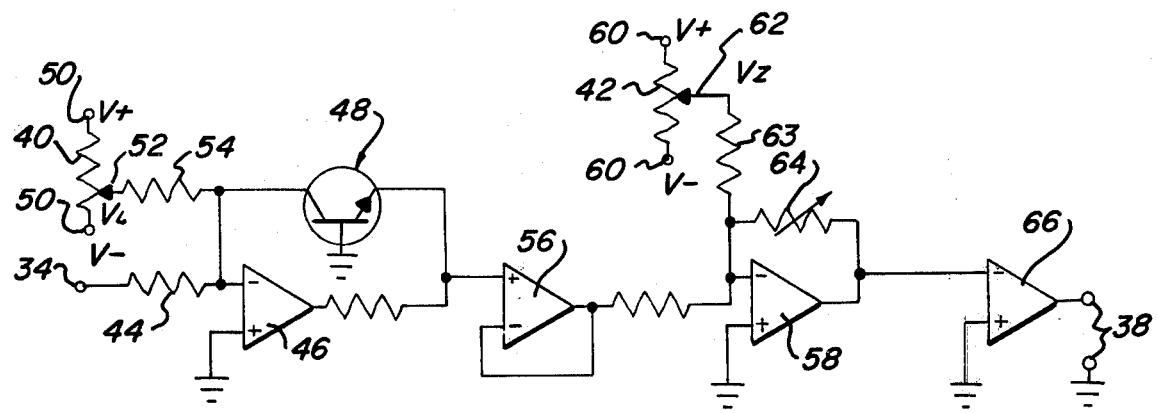
Fig_2
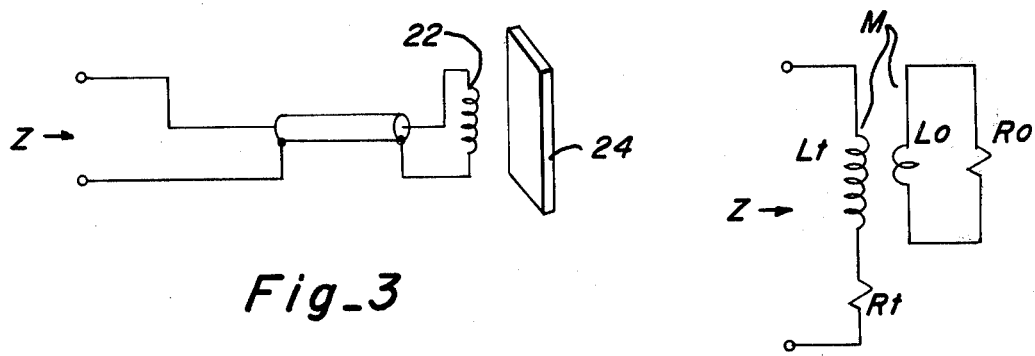
Fig_3
Fig_4

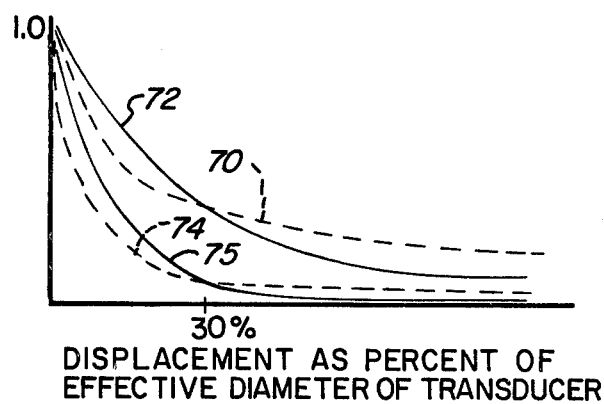
Fig_5
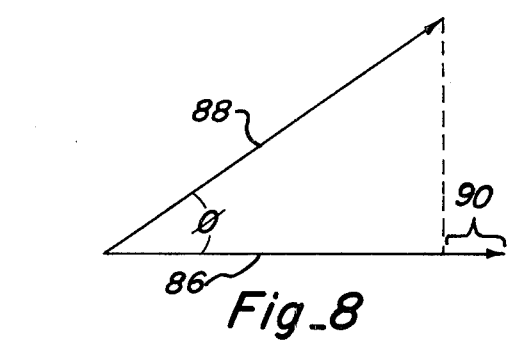
Fig_8
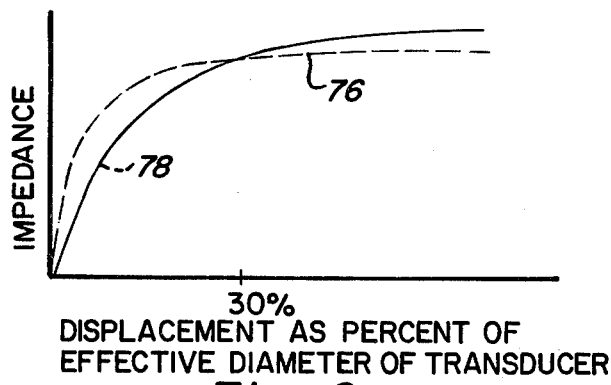
Fig_6
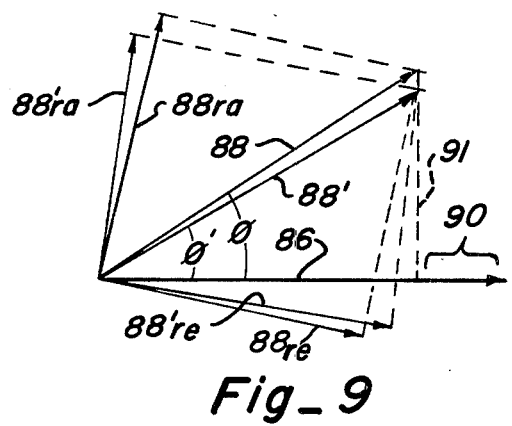
Fig_9
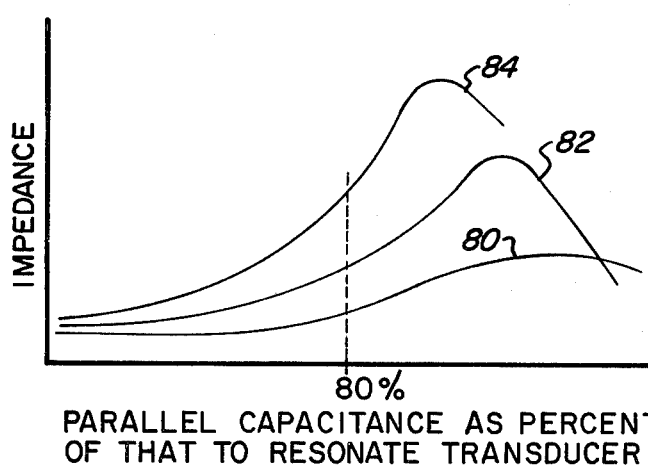
Fig_7
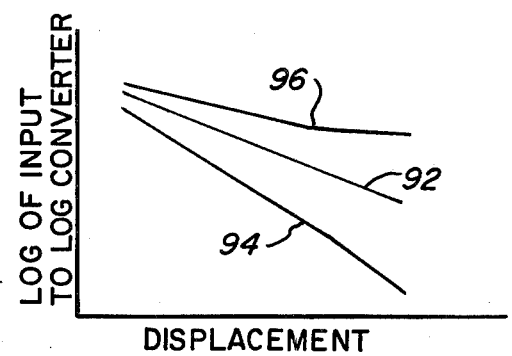
Fig_10

NON-CONTACT DISTANCE MEASUREMENT SYSTEM

BACKGROUND AND SUMMARY OF THE INVENTION

This invention relates to electronic distance systems, and more particularly, to such systems of the non-contact, variable-inductance type.

Electromagnetic induction phenomena has been employed in prior measurement systems to sense proximity or distance changes between a transducer and a metal object. Such measurement systems are useful in a wide variety of applications particularly where it is impossible or undesirable that there be physical contact with the object defining a distance to be measured. Other applications include pressure transducers, accelerometers, electronic micrometers, dimension comparators, bore gages, limit gages, and liquid-metal level detectors.

Previous electromagnetic induction measuring systems have not achieved the degree of accuracy and stability necessary for concise and accurate distance measurements. Certain limitations have restricted the devolpment of these prior art systems, such as the difficulty in obtaining sufficient sensitivity and resolution over the effective measurement range of the system. This limitation results from the failure of the prior art systems to distinguish between the magnetic properties of the object and to compensate for these properties. Another limitation has been error caused by temperature variations. Temperature changes cause impedance changes in the object and in the inductive distance-measuring components of the system, and these impedance changes are reflected as a change in distance when in reality no such change may have occurred. A further problem with prior art systems has been that of non-linearity. Previously, it has been impossible to obtain a system that would register a linear output relative to the linear change in distance measured. Accordingly, it is a general object of this invention to overcome the aforementioned limitations of the prior art.

It is an object of this invention to provide an improved non-contact distance measurement system exhibiting high sensitivity and resolution over the effective measurement range of the system.

It is another object of this invention to provide an improved non-contact distance measurement system which is virtually insensitive to variations in temperature of the system or of the object whose distance is to be measured.

It is a further object of this invention to provide an improved non-contact distance measurement system having a high degree of linear relationship between the output provided and the distance measured.

Briefly to achieve these and other objects the present invention in one embodiment comprises a high frequency signal source, an inductive transducer and a reference impedance both connected in a signal phase network and to the source, and a means for comparing the signals from the transducer and the reference impedance to provide an output related to the distance between the transducer and the object. A circuit element such as a capacitor is connected in parrallel with the transducer for the purpose of enhancing the sensitivity and resolution of the system, for significantly reducing or effectively eliminating errors caused by temperature variations in the transducer or in the object measured, and for providing a high degree of linear relation between the output provided and the distance measured. Further, the system insures a high degree of linearity over the effective measurement range of the system.

BRIEF DESCRIPTION OF THE DRAWINGS

A more complete understanding of the invention may be had by referring to the appended claims, to the accompanying detailed description and to drawings in which:

FIG. 1 is a diagram of the system of the present invention partially shown in block diagram form and partially illustrating certain circuit elements of the system;

FIG. 2 is a schematic diagram of one of the components shown in block diagram form in FIG. 1;

FIG. 3 is a perspective representation of an inductive transducer of FIG. 1 and an object whose distance is to be measured;

FIG. 4 is an equivalent circuit diagram of FIG. 3;

FIGS. 5, 6 and 7 are graphs of various physical relationships used to explain the operation of the invention;

FIGS. 8 and 9 are phasor diagrams of signals which explain the advantages and operation of the present invention; and, FIG. 10 is a graph of various outputs provided.

DETAILED DESCRIPTION OF THE INVENTION

An embodiment of the present invention is illustrated in FIG. 1 partially in block diagram form and with certain portions showing a detailed arrangement of circuit elements to specifically illustrate the invention. The system includes a high frequency signal source 10 such as a conventional and well-known oscillator. The source 10 is connected to and provides a signal phase network 12 which may be, for example, an electronic bridge illustrated as having branches 14, 16, 18 and 20. Branch 20 represents a distance-related impedance because connected to and forming a part of this branch 20 is a transducer such as a single coil inductor 22. As will subsequently be described more fully, the inductor 22 provides an impedance which varies in relation to the proximity of a metal object 24, and in so doing varies the impedance of branch 20. Branch 18 serves as a reference impedance for comparing signal changes across branch 20 caused by the impedance change of the transducer 22. Branches 14, 16 and 18 are fixed known impedance, and conveniently may be fixed value resistors.

Conductors 26 and 28 connect a cosine demodulator 30 to the signal phase network 12. Conductor 26 transmits a signal from branch 20 related to the impedance of the transducer or single coil inductor 22. A reference signal is supplied by conductor 28 from the reference impedance of branch 18. The signals appearing on conductors 26 and 28 form inputs to the cosine demodulator 30, otherwise known as a differential input phase sensitive demodulator and these signals are of identical frequency but may have a relative magnitude and phase difference between each other. The magnitude and phase difference will vary as a result of the variation in impedance of the inductive transducer 22 during distance measurement, when compared to the non-varying impedance of the reference impedance of branch 18. The cosine demodulator 30 will provide a DC output signal on conductor 34 which varies according to Equation 1 below:

$$E_o = V_r \cos\theta - V_1 \cos\phi \qquad \text{(Equation 1)}$$

where $E_o$ is the DC output signal appearing on conductor 34, $V_r$ is the magnitude of the signal appearing on the conductor 28, $\theta$ is the phase angle of the signal appearing on conductor 28 with respect to the signal appearing on conductor 32, $V_1$ is the magnitude of the signal appearing on conductor 26, and $\phi$ is the phase angle of the signal appearing on conductor 26 with respect to the signal appearing on conductor 32. Conductor 32 supplies a phase reference signal, $V_r$ 10°, from the source 10 to the cosine demodulator 30 which is necessary for the determination of the cosine of the phase angle of the two input signals. The cosine demodulator is conventional and well known; an example of which is Motorola synchronous detector No. MC1496, manufactured by Motorola, Inc. where 16 and 18 are fixed resistors and $\theta$ is 0°, (Equation 1) then becomes (Equation 1A) as follows:

$$E_o = V_r - V_1 \cos \phi \qquad \text{(Equation 1A)}$$

As will be seen from the following description of the operation, the signal appearing on conductor 34 is essentially logarithmic in character. A log convertor 36 is employed to change the logarithmic signal to a linear signal and to supply the linear signal to the output terminals 38. Variable resistances 40 and 42 are used to bias the convertor 36 thereby aiding in securing an extremely high degree of linearity during the measurement process as will be described subsequently in conjunction with FIG. 2.

Referring now to FIG. 2, the specific circuit of the modified log convertor 36 is illustrated. Signals from the cosine demodulator appearing on conductor 34 are transmitted through resistor 44 to the input of an operational amplifier 46. Transistor 48 having a grounded base is connected in the feedback loop of operational amplifier 46. The voltage-current characteristics of the transistor 48 are essentially logarithmic in character, and the use of the transistor in the feedback loop causes the first stage of the log convertor to be a logarithmic amplifier, thereby causing the output voltage of the logarithmic amplifier to be proportional to the antilogarithm of the input voltage on conductor 34. The variable resistor 40 is connected to a power supply at terminals 50, and a resistor 54 connects tap 52 of the variable resistor 40 to the input of the logarithmic amplifier stage. By varying the position of tap 52 a predetermined bias is summed with the input signal from conductor 34. This predetermined bias is essential in causing a high degree of linear correspondence between the output provided and the distance measured over a portion of effective measurement range. The foregoing described use of a transistor in the feedback path of an operational amplifier to cause logarithmic amplification characteristics is well known in the art; however, the addition of a pre-determined bias to the essentially logarithmic input signal is novel and very important in providing a high degreee of linear correspondence between the distance measured and the output provided. The effect of providing the high degree of linear correspondence will be described subsequently.

The second stage of the log convertor comprises an operational amplifier 56 and forms a voltage follower stage. This stage buffers the output from the logarithmic amplifier stage, and provides an output precisely following the output of the logarithmic amplifier stage regardless of the impedance to which the operational amplifier 56 is connected.

Operational amplifier 58 is used as a summing amplifier for amplifying the output signal from operational amplifier 56. Variable resistance 42 connected to a power supply at terminals 60 supplies a variable bias by means of tap 62 connected to resistor 63 to the input of the operational amplifier 58. This variable bias is added to the output from amplifier 56 and causes the output to be adjustable to a zero reading. By adjusting the variable resistor 42, the zero output at the terminals 38 is provided at the selected zero or reference distance from which the extent of the movement of the object will be measured. Variable resistor 64 in the feedback path of the amplifier 58 provides a means for adjusting the gain of the amplifier 58. By gain adjustment of variable resistor 64, an output voltage magnitude bearing a direct correspondence to the distance measured from the zero reference point may be obtained. Operational amplifier 66 is an inverting amplifier having low-pass filtering. This filtering attenuates any ripple which may be present as a result of the high frequency signal at any of the preceding stages. The inversion characteristic of the amplifier 66 is necessary so as to provide an increasing voltage input at terminals 38 with an increasing distance measured.

To facilitate understanding of the operation of the invention, the operation of an inductive transducer of the type illustrated at numeral 22 will first be described. An inductive transducer has impedance characteristics which vary primarily in accordance with the type of object whose displacement distance is sensed. For example, if an object of magnetic material is introduced into proximity with the inductive transducer, the inductive reactance of the transducer is normally increased. If the object is non-magnetic material, the inductive reactance is normally decreased. The higher permeability of the magnetic material adds to the self-inductance of the inductive transducer to increase the inductive reactance, but eddy currents induced in the surface of non-magnetic materials cause a counteracting magnetic field to decrease the inductive reactance. However, eddy currents are also sometimes induced in the surface of magnetic materials causing an eddy current effect which tends to counteract the effect of increased self-inductance of the transducer. Thus with magnetic materials it can only be stated in a general way that the inductive reactance of the transducer will be increased by the introduction of magnetic materials near the transducer.

A useful concept in analyzing the performance and operation of an inductive transducer is to consider its analogy to an air core transformer. FIG. 3 illustrates a conventional inductive transducer 22 illustrated as being used to measure the displacement distance between itself and a metal object 24. FIG. 4 illustrates an analogous air core transformer circuit of FIG. 3. The impedance Z described mathematically in terms of the circuit of FIG. 4 provides a relationship of the physical effect of movement of object 24 in relation to the impedance of inductive transducer 22. The equivalent inductance of the object 24 is shown as $L_o$ and its resistance is indicated as $R_o$. The self-inductance of the transducer 22 is illustrated as $L_t$ while its inherent resistance is $R_t$. Although the equivalent inductance and resistance in the induced current path of the object cannot be measured, their presence is reflected in the resistive and reactive components of the impedance of the primary winding of the air core transformer. The mutual inductance M between the primary and secondary winding inductances $L_t$ $L_o$, respectively, is related to the physical displacement between the transducer 22 and the object 24. The derivation of the desired relationship is readily obtainable by well-known methods of circuit and network analysis. Employing this relationship makes it possible to obtain an indication of the relative displacement between the transducer and the object merely by measuring the impedance of the primary winding.

The impedance-displacement relationship indicates that the coefficient of the coupling is the most significant variable in determining the displacement of the object 24 from the transducer 22. The coefficient of coupling, designated K in the formula below, generally relates to the mutual inductance M and flux linkage between the primary and secondary windings of the air core transformer. If object 24 is non-magnetic, the impedance of the primary winding derived by analogy to an air core transformer is generally shown by the following equation:

$$Z = jwL_t(1 - K^2), \quad \text{(Equation 2)}$$

based on conventional engineering and scientific methods. Empirical determination of the value of K for a non-magnetic object and spiral configurations of inductive transducers is illustrated in FIG. 5 by the dotted graph 70. It has been determined that graph 70 is an approximation of the mathematical expression:

$$K = 1.4 - 10s/d \quad \text{(Equation 3)}$$

where s is the displacement distance between the transducer and the object and d is the effective diameter of the spiral coil of the inductive transducer. The effective diameter of a spiral coil is approximately 0.77 times the outside diameter of the coil. Equation 3 to which the empirical data roughly corresponds indicates that the coefficient of coupling K varies relative to the displacement distance in a logarithmic fashion. Graph 72 in FIG. 5 is the curve according to Equation 3. Deviation of the empirically measured K illustrated in graph 70 from that of Equation 3 of graph 72 is shown to be negative during approximately the first 30% of the effective displacement measurement range, and positive during the remaining 70% of the effective measurement range. The effective measurement range is normally on the order of the diameter of the coil of the transducer.

In considering how the variation in K causes a variation in the impedance of the transducer according to Equation 2, it is necessary to consider the curve of the square of K, also illustrated in FIG. 5. Curve 74 illustrates the square of empirical 70, and curve 75 illustrates the square of the mathmetical curve 72. Referring now to the impedance formula of Equation 2 above, it can be seen that the impedance of the inductive transducer varies in proportion to $1-K^2$, and the curve of this impedance proportion is illustrated as graphs 76 and 78 in FIG. 6. Curves 76 and 78 illustrate the impedance relation of $1-K^2$ where K follows empirical curve 70 and the mathematical expression of graph 72, respectively, in FIG. 5. The curves of FIG. 6 thus show the impedance of the transducer as a function of the displacement distance between the transducer and a non-magnetic object 24. If the object 24 is of magnetic material, Equation 2 provides only a general indication of impedance since the self-inductance, $L_t$, of the transducer 22 is no longer constant due to the increase in permeability as explained previously. However, the basic relationship of graph 76 in FIG. 6 still holds for magnetic materials because the increased self-inductance at close displacements merely adds to the curved effect in the initial portion of graph 76 and does not therefore alter the relation illustrated.

Comparing curves 76 and 78 in FIG. 6 illustrates that the impedance relation for empirical performance of an inductive transducer follows curve 76, but if this performance were to follow the desired mathematical relationship, the curve 78 would be representative of the impedance. As previously explained, the mathematical approximation of K in Equation 3 is logarithmic, and thus graph 78 also has a logarithmic character. Since logarithmic functions can be readily approximated with electrical components, if the actual curve 76 is made to approximate mathematical curve 78 in FIG. 6, an electrical system can be provided to secure a high degree of linear correspondence between the impedance characteristic of the transducer and the distance measured. This invention achieves this desired result by providing a means whereby the actual characteristics of the transducer is caused to proportionally follow the desired curve 78 illustrated in FIG. 6.

The high degree of correspondence between a portion of the actual and mathematical curves is achieved in this invention by connecting a capacitor 100 in parallel with the inductive transducer 22, as shown in FIG. 1. The magnitude of the capacitor 100 in parallel to the inductive transducer 22 is very important in achieving the objects of the present invention. In order to achieve the required degree of linear correspondence between the distance measured and the output provided, a capacitor having a value in the range of 70% to less than 100% of that value necessary to cause resonance with the inductive transducer at the frequency of the high frequency source 10 is employed for non-magnetic materials. For magnetic materials the value of capacitance employed is from greater than 100% to 130% of that value necessary to cause resonance with the inductive transducer 22 at the frequency of the high frequency source 10. Due to the criticality of the selection of the capacitance value, tests are often required to determine the precise value of capacitance which must be added. Generally, the preferred range in which such tests fall is about 80% to about 90% for non-magnetic materials and about 110% to about 120% for magnetic materials, with the best results usually obtainable at approximately 80% and 120%, respectively.

The effect of capacitor 100 in parallel with inductive transducer 22 can generally be understood by referring to FIG. 7. Graphs 80, 82 and 84 show the variation in impedance of the parallel combination of the inductive transducer 22 and capacitor 100 in relation to the capacitance value selected. Graph 80 represents the impedance at a very close displacement distance betwen the transducer 22 and the object 24, graph 82 represents a medium displacement distance, and graph 84 represents a larger displacement distance. In comparing the relative changes of impedance along the 80% line in FIG. 7, it can be seen that proportionally greater impedance changes occur between graphs 84 and 82 than between graphs 82 and 80, compared to the same proportional changes at lower capacitor values. At close proximity, the inductive reactance of the transducer is reduced for non-magnetic objects as previously explained thus causing less of a resonant condition with little significant corresponding boost in impedance. But as the displacement increases, the sensed inductive reactance of the coil approaches that of the coil alone and a condition approaching resonance with a corresponding boost in impedance occurs.

By choosing the value of the capacitance as a predetermined percentage of that needed to create resonance, an effective means for causing the curve representing the impedance of the parallel-connected transducer and capacitor to proportionally conform to a significant portion of the curve 78 in FIG. 6 is attained. At close displacement distances, the inductance of the transducer has changed due to the presence of the object. The change in inductance has shifted the impedance characteristics of the parallel connected transducer and capacitor further from resonance, and has thus decreased the effective parallel impedance. This causes the curve representative of the parallel impedance of the transducer and capacitor to conform in proportional relation to approximately the first 30% % of curve 78, meaning that curve 76 of FIG. 6. has been shifted to approximate the first 30% curve 78 due to the addition of capacitor 100 in parallel with the transducer. Thus an actual logarithmic output is attained in this portion of the curve, and a high degree of correspondence between the actual and theoretical impedance curves results.

The selection of the value of capacitor 100 at a percentage greater than that necessary for resonance causes a similar effect when the object 24 is magnetic. As the magnetic object 24 comes in close proximity with the transducer 22, the effective impedance of the parallel combination of the capacitor 100 and transducer 22 is reduced since a condition further from resonance results because the magnetic material tends to increase the inductive reactance of the transducer. This effect causes the curve representative of the parallel impedance of the transducer and capacitor to conform in proportional relation to approximately the first 30% of the logarithmic curve 78.

It has also been found that the addition of capacitor 100 enhances the sensitivity of the system, meaning that the change in impedance in relation to the change in displacement distance is better distributed along the extent of the effective measurement range. This can be generally understood by reference to FIG. 6 in which it can be seen that the curve 78 is generally more sloping and provides a better representation of impedance changes versus displacement changes throughout its range. Curve 76 at some points represents extremely large impedance changes in relation to displacement changes, but in other portions exhibits almost insignificant impedance changes in relation to great displacement changes. FIG. 7 represents an actual graph of the sensitivity magnification. The sensitivity magnification there illustrated is represented by the increased spacing between the curves 80, 82 and 84 as a function of the capacitance value, for example, at the 80% value. Table 1 compares actual values of increased sensitivity as a result of using the capacitor 100 as here described and values resulting if capacitor 100 is not employed.

TABLE I

| Spacing | Impedance without Capacitor | Percent Change |
|---|---|---|
| 0 | 39.2 | 27% |
| .025 | 49.9 | 4.6% |
| .050 | 52.3 | 2.4% |
| ∞ | 53.6 | |

| Spacing | Impedance with Capacitor | Percent Change |
|---|---|---|
| 0 | 97.3 | 120% |
| .025 | 214.3 | 19.8% |
| .050 | 267.2 | 12.7% |
| ∞ | 306 | |

TABLE I-continued

It can be readily seen that the use of the capacitor in the present invention enhances sensitivity magnification and provides the ability of the sytem to yield precise output indications of the displacement distance measured.

The problem of providing a thermally stable distance measuring system is likewise overcome by employing capacitor 100. Temperature variations cause the resistance of the transducer to vary which alters the impedance characteristics of the transducer. Furthermore, temperature causes the resistive and magnetic properties of the object to vary, and these variances are reflected as impedance changes of the transducer. By the proper selection of the value for capacitor 100, thermal compensation for these factors is also achieved. Generally, the value selected for providing increased linearity, and sensitivity, also results in temperature compensation as well. When the system is designed particularly to enhance one characteristic or the other, i.e. linearity and sensitivity or temperature compensation, the value of the capacitance selected for emphasizing this characteristic will also improve the other characteristic. These factors result in the present invention's ability to achieve improved performance which was heretofore impossible with prior art systems.

A general explanation of how the capacitor 100 provides temperature compensation can be understood by reference to FIG. 8. Shown there are vectors 86 and 88. Vector 86 represents a reference vector present across reference branch 18 of the signal phase network 12 in FIG. 1. In this example, reference branch 18 is assumed to be resistive, therefore, vector 86 is at zero phase angle. Vector 88 is that vector present across the distance-related branch 20 of the signal phase network 12. Vector 88 is displaced by a phase angle $\phi$ from the vector 86. The phase angle $\phi$ is a result of the complex impedance of the transducer 22 and the capacitor 100 comprising the distance-related impedance 20. Recalling that the function of the cosine demodulator is to provide an output indicative of vector 86 magnitude times cosine 0° - vector 88 magnitude times cosine $\phi$, it can be seen that the output of the cosine demodulator in the case of the vectors in FIG. 8 is represented by vector 90. Vector 90 represents a signal indicative of the distance sensed between the transducer 22 and the object 24. It is vector 90 which is rendered relatively unaffected by temperature as displacement distance remains the same.

Referring now to FIG. 9, vector 88 has been shown as the sum of its two component vectors, the real component $88_{re}$ and the reactive component $88_{ra}$. The addition of $88_{re}$ and $88_{ra}$ provide the resultant vector 88. Also illustrated is vector 88' which represents the change in vector 88 across the distance-related impedance 20 as a result of temperature when compensation by capacitor 100 is provided. With a temperature change, the vector 88 shifts from its position illustrated at 88 to the position 88', for example. Vector 88' is likewise broken into its real and reactive components $88'_{re}$ and $88'_{ra}$, respectively. With temperature changes, it can be seen from vectors 88 and 88' that the respective phase relationships shift and respective magnitudes change. By employing the proper value of capacitance 100, the net result of these various changes can be essentially eliminated. As the magnitude and phase of the vector changes, the resultant vector 88' closely follows a line 91 perpendicular to the vector 86. Because the temperature changes cause the vector to follow a line perpendicular to vector 86, it can be seen that the magnitude of vector 88 times its cosine is always a constant thus resulting in the constant vector value 90 when subtracted from the vector 86. Thus by the choice of a capacitor 100 within the values indicated results in a non-contact distance measuring system which is also virtually insensitive to temperature.

The previous discussion has illustrated that the proper selection of a value for capacitor 100 will provide a high degree of linear correspondence between tranducer impedance and the desired logarithmic characteristics suggested by mathematical analysis. This linear correspondence, however, is primarily confined only to the first 30% of the curves illustrated in FIGS. 5 and 6 as has previously been described. It therefore becomes necessary to provide a means for securing linear correspondence during approximately the latter 70% of these curves. Such a means is provided by the log convertor previously described in conjunction with FIG. 2. Illustrated in FIG. 2 is the variable resistor 40 which supplies a bias or offset voltage to the input of operational amplifier 46. By proper adjustment of the offset voltage, the logarithmic output of the operational amplifier 46 is caused to closely approximate the logarithmic curve desired for the approximate last 70% of the effective distance measurement range.

Curve 92 of FIG. 10 illustrates the desired performance curve of the non-contact distance measurement system of the present invention as a result of employing capacitor 100 of a value in the ranges disclosed and adjusting the bias or appropriate offset voltage at variable resistor 40 of the log convertor to the correct value. Curve 92 illustrates that in the preferred embodiment the sum of the voltages supplied to the input of the log convertor precisely follows the relationship of a logarithm. The relationship of graph 92 indicates that a precise linear output at terminals 38 will result, thereby securing a high degree of linear correspondence between the distance measured and the output provided. Curves 94 and 96 illustrate the non-logarithmic correspondence obtained when the bias or offset voltage supplied to the input of the convertor is incorrect.

The method of using and calibrating the present invention will now be described by reference to FIGS. 1 and 2. Prior to actual use, a value for capacitor 100 has been selected and the inductive transducer 22 has been retained in a jig. A micrometer or other sensitive measuring instrument is used to measure the displacement distance between the object 24 and the transducer. The object is moved to the closest or reference position which it is desired that the system measure. The source of bias voltage from resistor 40 is allowed to assume an initial arbitrary position. The source of reference voltage from resistor 42 is adjusted so that any value of voltage is present at the output terminals 38, but this voltage will usually be zero to indicate the reference position. The object is then moved a predetermined desired maximum measurement distance according to the micrometer. Linearity adjustment resistor 40 is then adjusted so as to provide a maximum output voltage at terminals 38 which relates in any selected manner to the maximum effective measurement distance. The object is then moved to any intermediate distance between the reference and maximum positions and the voltage output at terminals 38 is checked. The voltage output at the intermediate position should bear a direct relation to the maximum output voltage as the distance of object 24 is to the maximum effective measurement-distance. If the voltage does not have the desired relation, the gain adjustment resistor 64 is adjusted until the proper proportiona is secured. The whole procedure is repeated as many times as necessary. After a number of these calibration procedures have been accomplished, the system will be properly adjusted to secured the before-mentioned advantages. If it is found that mere adjustment of the voltage sources and gain resistor does not secure the desired performance, the value of capacitor 100 must be changed slightly and the adjustment procedures repeated. After attaining the proper value for capacitor 100 and the proper adjustment of the system, the present invention is ready to employ in its desired environment.

From the foregoing description of the invention, it can readily be seen that the non-contact distance measuring system secures highly accurate performance. This system provides an extremely high degree of linearity between the voltage output provided and the distance measured by the transducer. Since the system is virtually insensitive to variations in temperature, the high degree of linearity is sustained for wide variations of temperature. Furthermore, the invention provides a high degree of sensitivity and resolution over the effective range of distance measured. The foregoing advantages and achievements over the prior art have yielded an invention whose output typically deviates less than 0.2% in actual measurement from the actual displacement distance. This is a resolution and linearity greater than most conventional measuring devices can provide.

Although a single embodiment of the non-contact distance measuring system has been shown and described, those skilled in the art will perceive changes and modifications without departing from the invention. Therefore, it is intended by the appended claims to cover all such changes and modifications as fall within the true spirit and scope of the invention.

What is claimed is:

1. Apparatus for measuring distance to an object, comprising:
   means for generating an AC signal at a predetermined substantially constant frequency;
   distance-related impedance means connected to said signal generating means and excited by said constant frequency AC signal for indicating object distance by variations in its impedance characteristic, said distance-related impedance means including at least first and second interconnected impedance elements, said first impedance element being inductive means whose impedance varies in proportion to object distance, said second impedance element having a selectively set impedance value which combines with said first impedance element to produce a resultant impedance characteristic for said distance-related impedance means which is substantially a logarithmic function of object distance over a first range of distance, said first range commencing at substantially zero distance and increasing up to an ascertainable point, whereby the magnitude of the electrical signal generated across said distance-related impedance means is logarithmically proportional over said first range to object distance;

wherein said AC signal is a high frequency signal;
wherein said second impedance element is capacitive means;
wherein said second impedance element is connected in parallel with said first impedance element;
including means responsive to the electrical signal generated across said distance-related impedance means for generating therefrom an output signal linearly proportional over said first range to object distance; and,
wherein said linear output generating means comprises means for generating a selected bias signal and a log converter circuit; said log converter circuit being responsive to the electrical signal generated across said distance-related impedance means to generate said output signal linearly proportional over said first range to object distance; said log converter circuit further being responsive to said selected bias signal to produce an offset in the remaining portion of said output signal, which represents object distances outside of said first range, to render said remaining signal portion also substantially linearly proportional to object distance.

2. Apparatus for measuring distance to an object, comprising:
means for generating an AC signal at a predetermined substantially constant frequency;
distance-related impedance means connected to said signal generating means and excited by said constant frequency AC signal for indicating object distance by variations in its impedance characteristic, said distance-related impedance means including at least first and second interconnected impedance elements, said first impedance element being inductive means whose impedance varies in proportion to object distance, said second impedance element having a selectively set impedance value which combines with said first impedance element to produce a resultant impedance characteristic for said distance-related impedance means which is substantially a logarithmic function of object distance over a first range of distance, said first range commencing at substantially zero distance and increasing up to an ascertainable point, whereby the magnitude of the electrical signal generated across said distance-related impedance means is logarithmically proportional over said first range to object distance;
including means responsive to the electrical signal generated across said distance-related impedance means for generating therefrom an output signal linearly proportional over said first range to object distance; and,
wherein said linear output generating means comprises means for generating a selected bias signal and a log converter circuit; said log converter circuit being responsive to the electrical signal generated across said distance-related impedance means to generate said output signal linearly proportional over said first range to object distance; said log converter circuit further being responsive to said selected bias signal to produce an offset in the remaining portion of said output signal, which represents object distances outside of said first range, to render said remaining signal portion also substantially linearly proportional to object distance.

3. Apparatus for measuring distance to an object, comprising:
means for generating an AC signal at a predetermined substantially constant frequency;
distance-related impedance means connected to said signal generating means and excited by said constant frequency AC signal for indicating object distance by variations in its impedance characteristic, said distance-related impedance means including at least first and second interconnected impedance elements, said first impedance element being inductive means whose impedance varies in proportion to object distance, said second impedance element having a selectively set impedance value which combines with said first impedance element to produce a resultant impedance characteristic for said distance-related impedance means which is substantially a logarithmic function of object distance over a first range of distance, said first range commencing at substantially zero distance and increasing up to an ascertainable point, whereby the magnitude of the electrical signal generated across said distance-related impedance means is logarithmically proportional over said first range to object distance, wherein:
the electrical signal generated on said distance-related impedance means has a phase angle $\phi$ relative to said AC signal; and including:
reference impedance means connected to said signal generating means and excited by said constant frequency AC signal for generating a reference signal of selected magnitude and phase angle $\theta$ relative to said AC signal; and,
means responsive to the electrical signals generated across said distance-related impedance means and said reference impedance means for producing a substantially temperature insensitive signal equal to the difference between the magnitude of said reference signal times the cosine of $\theta$ and the magnitude of the electrical signal across said distance-related impedance means times the cosine of $\theta$, said temperature insensitive signal being substantially logarithmically proportional over said first range to object distance.

4. The invention defined in claim 3, wherein said second impedance element is capacitive means.

5. The invention defined in claim 4, wherein said second impedance element is connected in parallel with said first impedance element.

6. The invention defined in claim 5, wherein said AC signal is a high frequency signal.

7. The invention defined in claim 6, wherein the value of the capacitance of said capacitive means is in the range of 70% to less than 100% of that value necessary at said predetermined frequency to form a resonant circuit with said inductive means whereby said apparatus is particularly suited for use in measuring distance to objects made of non-magnetic materials.

8. The invention defined in claim 6, wherein the value of the capacitance of said capacitive means is in the range of from greater than 100% to 130% of that value necessary at said predetermined frequency to form a resonant circuit with said inductive means whereby said apparatus is particularly suited for use in measuring distance to objects made of magnetic materials.

9. The invention defined in claim 5, including means responsive to the electrical signal generated across said distance-related impedance means for generating therefrom an output signal linearly proportional over said first range to object distance.

10. The invention defined in claim 9, wherein said linear output generating means comprising means for generating a selected bias signal and a log converter circuit; said log converter circuit being responsive to the electrical signal generated across said distance-related impedance means to generate said output signal linearly proportional over said first range to object distance; said log converter circuit further being responsive to said selected bias signal to produce an offset in the remaining portion of said output signal, which represents object distances outside of said first range, to render said remaining signal portion also substantially linearly proportional to object distance.

11. The invention defined in claim 10, wherein said AC signal is a high frequency signal.

12. A method of measuring distance to an object, including the steps of:

utilizing an inductive impedance element to sense object distance by variations in its impedance;

combining another impedance element with the inductive impedance element to produce a resultant impedance characteristic for the combined impedance elements which is substantially a logarithmic function of object distance over a first range of distances, the first range commencing at substantially zero distance and increasing up to an ascertainable point; and generating a distance-related signal having a magnitude directly proportional to the resultant impedance characteristic whereby the distance-related signal is logarthmically proportional over the first range to object distance;

including combining said distane-related signal with a selected reference signal to produce a resultant distance-related signal having a magnitude which is substantially independent of temperature variations;

including the step of converting the resultant distance-related signal to an output signal linearly proportional over the first range to object distance; and, including offsetting the portion of the output signal representing object distances outside of the first range to render same also substantially proportional to object distance.

* * * * *